United States Patent
Ubale et al.

(10) Patent No.: US 11,203,276 B1
(45) Date of Patent: Dec. 21, 2021

(54) TRIM SUPPORT FOR VEHICLE SEAT

(71) Applicant: Faurecia Automotive Seating, LLC, Auburn Hills, MI (US)

(72) Inventors: Sachin Ubale, Auburn Hills, MI (US); Yogesh Shitole, Pune (IN); Tushar Wandhare, Pune (IN)

(73) Assignee: Faurecia Automotive Seating, LLC, Auburn Hills, MI (US)

( * ) Notice: Subject to any disclaimer, the term of this patent is extended or adjusted under 35 U.S.C. 154(b) by 0 days.

(21) Appl. No.: 17/002,125

(22) Filed: Aug. 25, 2020

(51) Int. Cl.
*B60N 2/22* (2006.01)
*B60N 2/58* (2006.01)

(52) U.S. Cl.
CPC .......... *B60N 2/2222* (2013.01); *B60N 2/58* (2013.01); *B60N 2/5891* (2013.01); *B60N 2002/2204* (2013.01)

(58) Field of Classification Search
CPC .......... B60N 2/2222; B60N 2/22; B60N 2/58; B60N 2/5891; B60N 2/5816; B60N 2002/2204
USPC ...................................................... 297/284.1
See application file for complete search history.

(56) References Cited

U.S. PATENT DOCUMENTS

| | | | |
|---|---|---|---|
| 6,550,856 B1* | 4/2003 | Ganser | B60N 2/20 297/61 |
| 8,033,610 B2 | 10/2011 | Graber | |
| 9,889,773 B2* | 2/2018 | Line | B60N 2/68 |
| 9,914,378 B1 | 3/2018 | Line | |
| 10,625,644 B2 | 4/2020 | Line | |
| 11,007,908 B2* | 5/2021 | Gaines | B60N 2/2222 |
| 11,027,633 B2* | 6/2021 | Line | B60N 2/6009 |
| 2018/0009339 A1* | 1/2018 | Durkee | B60N 2/2222 |
| 2018/0134181 A1* | 5/2018 | Ketels | B60N 2/2222 |

FOREIGN PATENT DOCUMENTS

DE 102007061903 B3 6/2009

OTHER PUBLICATIONS

International (PCT) Search Report and Written Opinion for PCT/US2021/045911 dated Oct. 4, 2021, 6 pages.

* cited by examiner

*Primary Examiner* — Mark R Wendell
(74) *Attorney, Agent, or Firm* — Barnes & Thornburg LLP (57) ABSTRACT

An occupant support a seat bottom and a seat back. The seat back includes a backrest including and an upper-back adjuster coupled to the backrest at least partially movable between a retracted position and an extended position. The occupant support is at least partially covered in an outer trim including a backrest portion and an adjuster portion that moves relative to the backrest portion. The outer trim blocks view of an interior of the seat back.

20 Claims, 6 Drawing Sheets

TRIM SUPPORT FOR VEHICLE SEAT

BACKGROUND

The present disclosure relates to vehicle seats, and particularly to vehicle seats with movable components. More particularly, the present disclosure relates to a vehicle seat with movable components and an outer trim that covers the movable components.

SUMMARY

According to the present disclosure, an occupant support for a vehicle includes a seat bottom and a seat back coupled to the seat bottom and arranged to extend upwardly away from the seat bottom. The seat back includes a backrest and an upper-back adjuster coupled to the backrest for movement relative to the backrest between a fully-retracted position and a fully-extended position.

In illustrative embodiments, the backrest includes a backrest frame, one or more backrest foam pads, and a backrest trim that at least partially covers the backrest frame and the one or more backrest foam pads. The upper-back adjuster is mounted to the backrest frame and includes an adjuster plate, an adjuster trim, and an actuator configured to move the adjuster plate and the adjuster trim between the extended and retracted positions.

In illustrative embodiments, the seat back further includes a trim support coupled to the backrest frame in a fixed position relative to the upper-back adjuster. The backrest trim and the adjuster trim may be made from the same material and each form parts of the same overall outer trim for the seat back. The backrest trim is configured to couple with the trim support to locate the backrest trim relative to the adjuster trim. The trim support is shaped so that the backrest trim and the adjuster trim cooperate with one another to provide an aesthetic outer cover for the seat back in both the retracted and extended positions.

Additional features of the present disclosure will become apparent to those skilled in the art upon consideration of illustrative embodiments exemplifying the best mode of carrying out the disclosure as presently perceived.

BRIEF DESCRIPTION OF THE DRAWINGS

The detailed description particularly refers to the accompanying figures in which.

DETAILED DESCRIPTION

Figure 1:
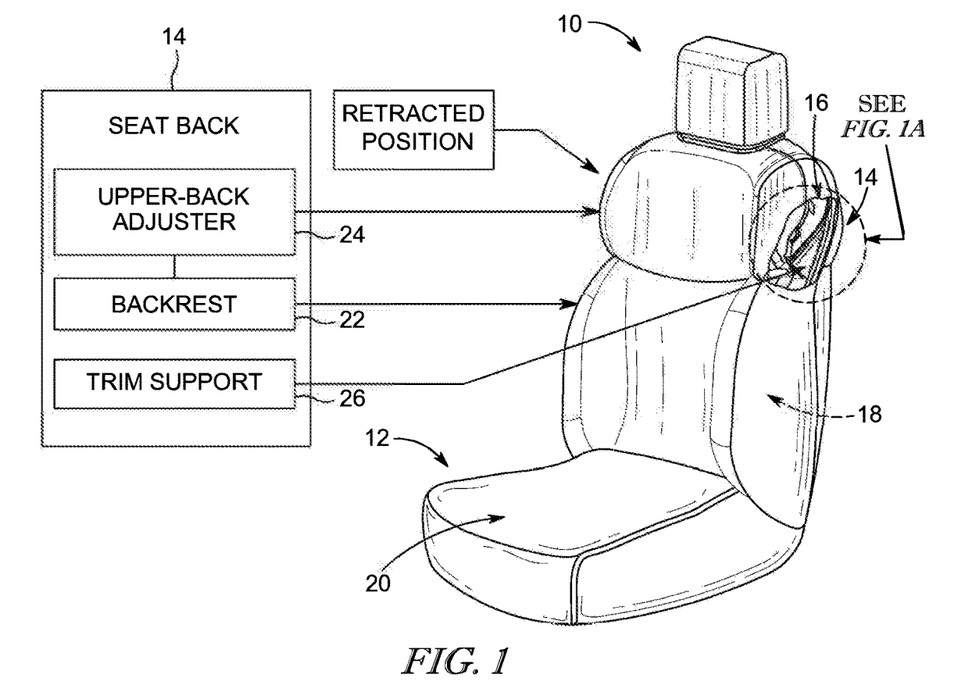
FIG. 1 is a perspective and diagrammatic view of an occupant support in accordance with the present disclosure including a seat bottom and a seat back at least partially covered in an outer trim, and showing a portion of the outer trim cutaway to show that the seat back includes a backrest, an upper-back adjuster coupled to the backrest and configured to move between a retracted position and an extended position, as shown in FIG. 2, and a trim support coupled to the backrest in a fixed position relative to the backrest and the upper-back adjuster and configured to receive the outer trim of the occupant support as shown in FIGS. 4A and 5A.
Figure 2:
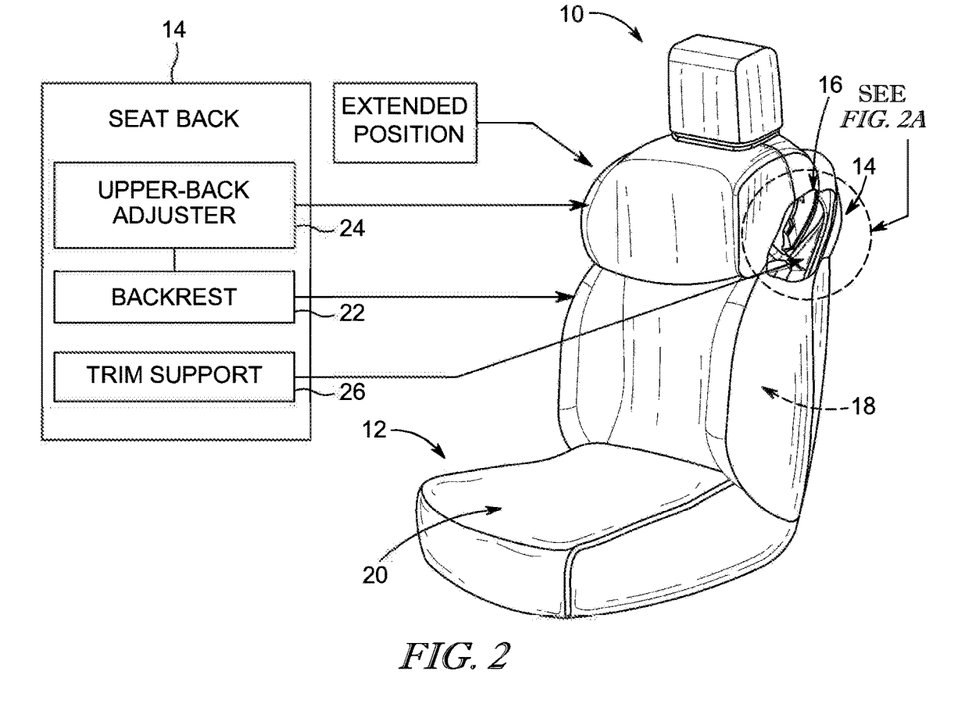
FIG. 2 is a perspective and diagrammatic view of the occupant support with the upper-back adjuster moved to the extended position in which at least a portion of the upper-back adjuster is arranged farther forward relative to the backrest and the trim support and showing that the trim support is sized and shaped such that the trim support fills an interface gap between the backrest and the upper-back adjuster so that the outer trim of the occupant support is visible in the extended position and no internal structures of the occupant support are visible to occupants.

An illustrative occupant support 10, in accordance with the present disclosure, is shown in FIGS. 1 and 2 and includes a seat bottom 12 and a seat back 14 arranged to extend upwardly from the seat bottom 12. The seat bottom 12 and the seat back cooperated to support an occupant on the occupant support 10 for transportation in a vehicle in illustrative embodiments. The occupant support 10 also includes a frame 16 that provides structural rigidity for both the seat bottom 12 and the seat back 14, foam pads 18 to increase occupant comfort, and an outer trim 20 that covers the foam pads 18 and the frame 16 to provide greater aesthetics for the occupant support 10.

Figure 1A:
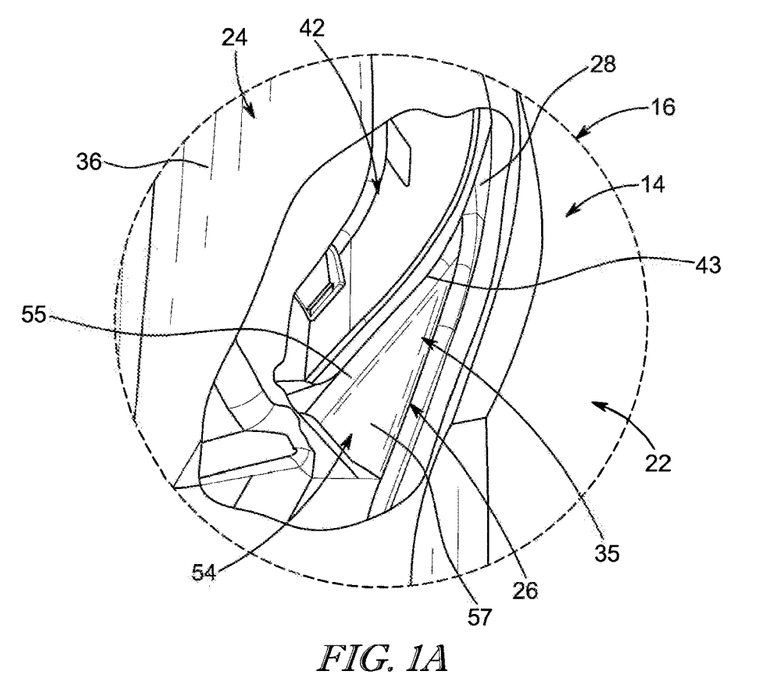
FIG. 1A is an enlarged view of the region indicated by the dashed circle in FIG. 1 showing the position of the trim support relative to the backrest and the upper-back adjuster when the upper-back adjuster is in the retracted position.
Figure 2A:
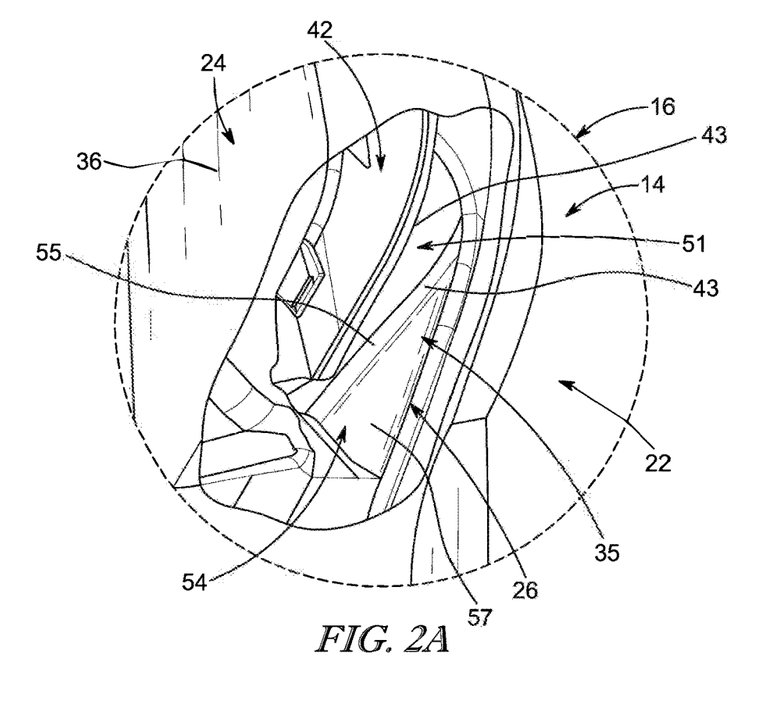
FIG. 2A is an enlarged view of the region indicated by the dashed circle in FIG. 2 showing the position of the trim support relative to the backrest and the upper-back adjuster when the upper-back adjuster is in the extended position.

The seat back 14 includes a backrest 22, an upper-back adjuster 24, and a trim support 26 as shown in FIGS. 1 and 2. Portions of the frame 16, foam pads 18 and outer trim make up both the backrest 22 and the upper-back adjuster 24. The backrest 22 is coupled to the seat bottom 12 and extends upwardly away from the seat bottom 12. The upper-back adjuster 24 is coupled to the backrest and is configured to move forward and backward relative to the backrest 22 between a fully retracted position, as shown in FIGS. 1 and 1A, and a fully extended position, as shown in FIGS. 2 and 2A. The upper-back adjuster 24 may be locked at any point between the retracted position and the extended position. The trim support 26 is coupled to the backrest 22 in a fixed position relative to the backrest 22 and the upper-back adjuster 24 and is configured to provide means for mounting the at least a portion of the outer trim 20 in a stationary position relative to the backrest 22 and the upper-back adjuster 24 to cover internal, unaesthetic components of the occupant support 10.

Figure 3:
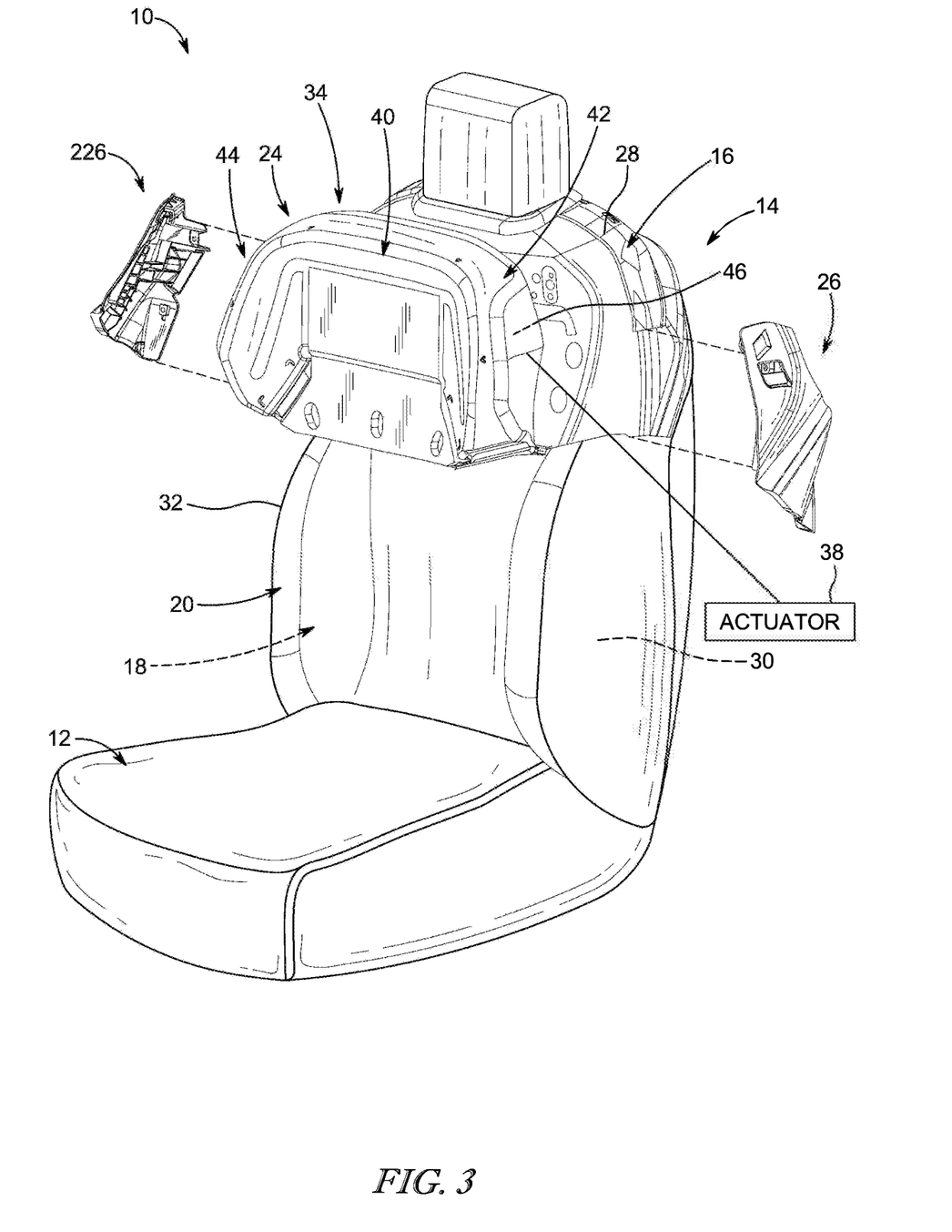
FIG. 3 is an exploded assembly view of the occupant support showing that the occupant support includes a pair of trim supports with one trim support being coupled to the backrest on each lateral side of the occupant support.

The backrest 22 includes a backrest frame 28, a backrest foam pad 30, and a backrest trim 32 as shown in FIGS. 1-3. The backrest frame 28 forms a part of the overall frame 16 and rigidly supports the seat back 14 in an upright position relative to the seat bottom 12. The backrest foam pad 30 forms a part of the foam pads 18 in the occupant support 10 and at least partially covers the backrest frame 28 to increase comfort for an occupant seated on occupant support 10. The backrest trim 32 forms a part of the overall outer trim 20 and at least partially covers the backrest frame 28 and the backrest foam pad 30.

The upper-back adjuster 24 includes an adjuster plate 34, an adjuster trim cover 36 arranged to cover the adjuster plate 34, and an actuator 38 configured to move the adjuster plate 34 and the adjuster trim 36 relative to the backrest 22 between the retracted position and the extended position. The adjuster plate 34 is illustratively positioned near a top edge of the backrest 22 to support an occupant's shoulders while seated on the occupant support 10. The adjuster trim 36 forms a part of the overall outer trim 20 of the occupant support and is partially separated from the backrest trim 32 so that the adjuster trim 36 can move relative to the backrest 22 with the adjuster plate 34 between the retracted and extended positions. The actuator 38 may be a mechanical actuator or a pneumatic actuator in illustrative embodiments.

The trim support 26 is coupled to the backrest 22 in a fixed position relative to the backrest 22 as shown in FIGS. 1-2A. The backrest trim 32 is coupled to the trim support 26 to position the backrest trim 32 relative to the upper-back adjuster 24 in a location that obstructs view of an interior of the seat back 14. The trim support 26 occupies an interface gap 35 formed between the adjuster plate 34 and the backrest 22 when the adjuster plate 34 and the adjuster trim 36 are in the retracted and extended positions. The backrest trim 32 is arranged to cover the trim support 26 so that only the backrest trim 32 is visible in the interface gap 35 when the adjuster plate 34 and the adjuster trim 36 are in the extended position to block the interior of the seat back 14 from view. The backrest trim 32 and the adjuster trim 36 cooperate to provide an aesthetic cover for the seat back 14 at the interface gap 35.

The occupant support 10 illustratively includes a first trim support 26 on a first lateral side (i.e. inboard side) of the seat back 14 and a second trim support 226 on an opposite second side (i.e. outboard side) of the seat back 14 as shown in FIG. 3. The first and second trim supports 26, 226 position the backrest trim 32 relative to the adjuster plate 34 so that the backrest trim 32 and the adjuster trim 36 provide the aesthetic cover for the seat back 14 at an interface gap 35 on both lateral sides of the seat back 14 formed as a result of the shape of the adjuster plate 34. The adjuster plate 34 includes a front panel 40, a first side wing 42, and an opposite second side wing 44 as shown in FIG. 3. The front panel 40 extends between and interconnects the first side wing 42 and the second side wing 44 and supports an occupant's upper back region. The first side wing 42 and the second side wing 44 extend rearwardly from the front panel 40 and cradle each respective lateral side of the backrest 22 in at least the retracted position. The adjuster trim 36 covers the front panel 40 and wraps around the first side wing 42 and the second side wing 44 to be attached to inner surfaces 46 of the adjuster plate 34. The inner surfaces 46 of the adjuster plate 34 face inwardly toward the interior of the seat back 14 and toward the trim supports 26, 226 to interact with the trim supports 26, 226. The adjuster trim 36 may be attached to the inner surfaces 46 of the first and second side wings 42, 44 by any suitable means, such as by hooks, fasteners, stitching, adhesive, or any other suitable attachment method, for example.

Figure 4A:
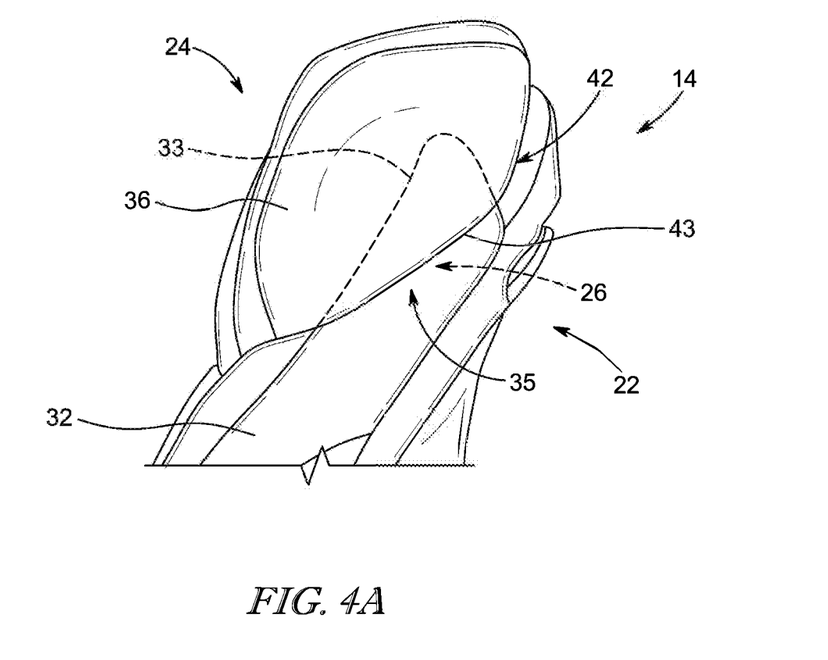
FIG. 4A is a side view of a portion of the seat back showing the seat back covered in an outer trim and the upper back adjuster in the retracted position.
Figure 4B:
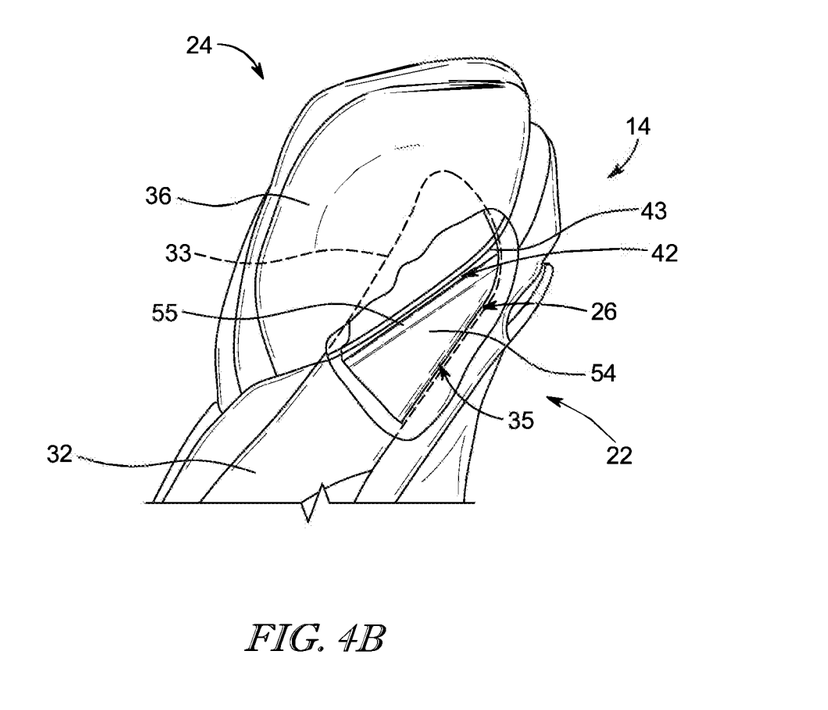
FIG. 4B is a side view similar to FIG. 4A with a portion of the outer trim cut away to show the trim support located between the backrest and the upper-back adjuster.
Figure 5A:
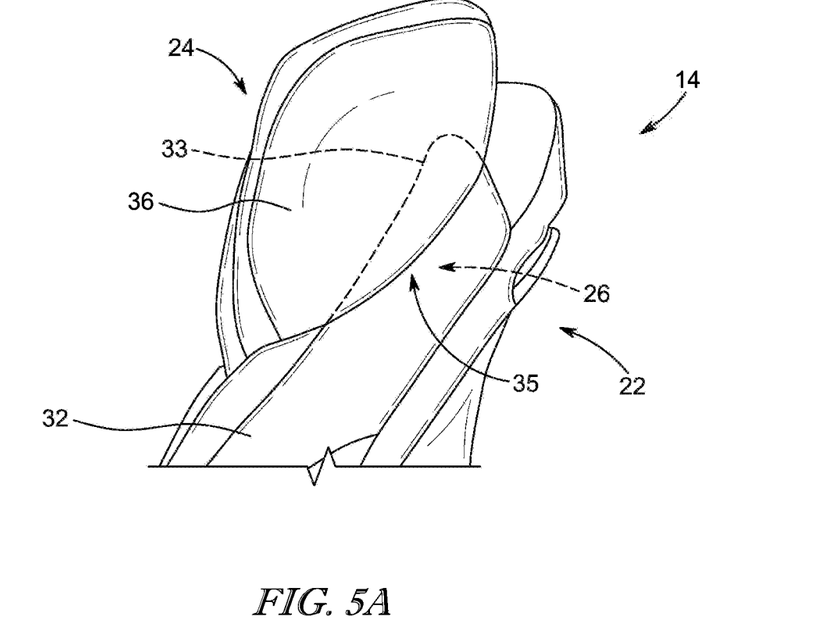
FIG. 5A is a side view of a portion of the seat back showing the seat back covered in an outer trim and the upper back adjuster in the extended position with only the outer trim being visible due to the trim support.
Figure 5B:
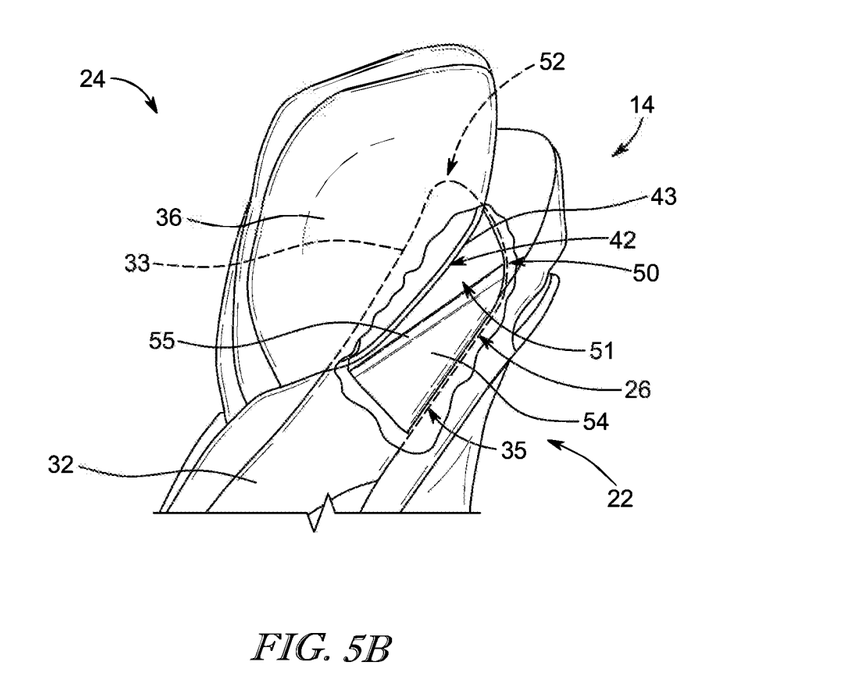
FIG. 5B is a side view similar to FIG. 5A with a portion of the outer trim cut away to show the trim support located between the backrest and the upper-back adjuster.

The first side wing 42 and the second side wing 44 at least partially cover or overlap with a companion trim support 26, 226 when the adjuster plate 34 is in the retracted position as shown in FIGS. 4A and 4B. When the adjuster plate 34 is moved to the extended position, the adjuster plate 34 and the adjuster trim 36 shift or pivot forward relative to the backrest 22 and the trim support 26 as shown in FIGS. 5A and 5B.

In the extended position, the first side wing 42 and the second side wing 44 continue to partially overlap with each companion trim support 26, 226 thereby locating the adjuster trim 36 and the backrest trim 32 relative to one another to provide the aesthetic outer cover of the seat back 14 blocking view of the interior of the seat back 14. A rearmost edge 43 of the first and second side wings 42, 44 is arranged lie rearward of a forwardmost edge 33 of the backrest trim 32 on the portion of the backrest trim 32 that attaches to the trim support 26. In this way, the adjuster trim 36 is positioned in an overlapping arrangement with the backrest trim 32 at all times so that only outer trim 20 is visible from outside the seat back 14. Portions of the backrest trim 32 including the forwardmost edge 33 are shown in dashed lines in FIGS. 4A-5B to show that the rearmost edge 43 of the side wing 42 always remains rearward of the forwardmost edge 33 so that only the backrest trim 32 is visible in interface gap 35.

The trim supports 26, 226 locate the backrest trim 32 relative to the adjuster plate 34 to provide the overlapping arrangement between the adjuster trim 36 and the backrest trim 32 as shown in FIGS. 4A-5B. Both trim supports 26, 226 are substantially similar except that trim support 226 is shaped to be coupled to the second lateral side of the backrest 22. Accordingly, only trim support 26 is described below and the description of trim support 26 is hereby incorporated herein its entirety for trim support 226.

The trim support 26 is a separate component from the backrest 22 and the upper-back adjuster 24 in illustrative embodiments and is made from a plastic material that is molded to fit the particular occupant support 10 to which it is mounted. In some embodiments, the trim support 26 may be made integral with the backrest 22 and may be made from another suitable material such as a metallic material, for example. The trim support 26 may be formed to have any shape suitable for use with different occupant supports with other shapes and sizes for its backrest and upper-back adjuster.

Figure 6:
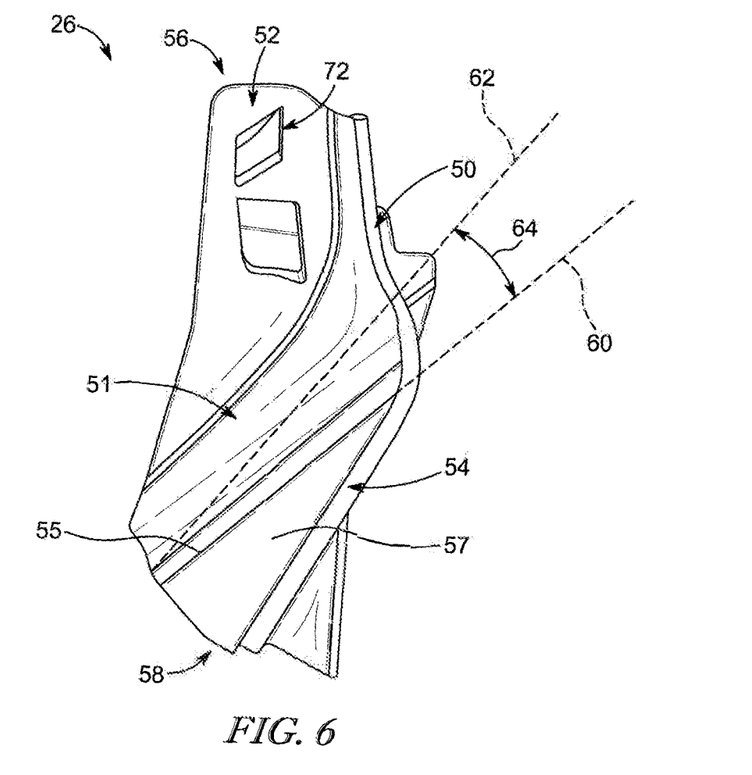
FIG. 6 is an enlarged side view of the trim support with dashed lines representing boundaries of upper back adjuster relative to the trim support in both retracted position and the extended position.
Figure 7:
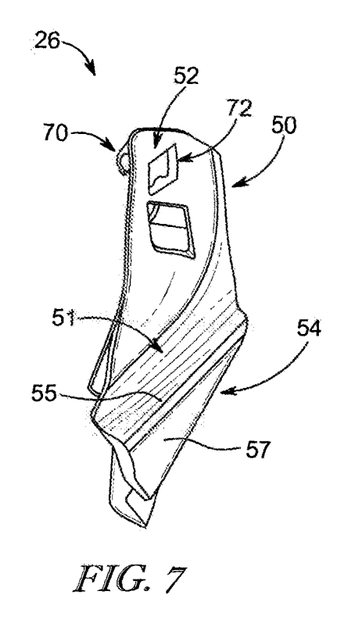
FIG. 7 is a perspective view of the trim support showing attachment location for the outer trim to locate the outer trim behind the upper back adjuster when the upper back adjuster is in the extended position.
Figure 8:
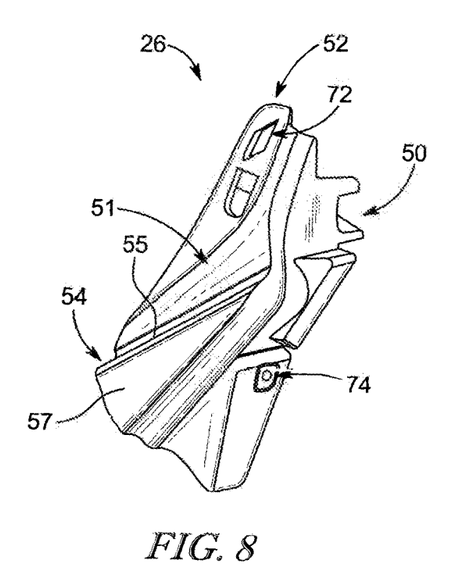
FIG. 8 is a perspective view of trim support from another orientation various attachment features that can be used to mount the trim support and other components of the occupant support to the backrest.

The trim support 26 includes a trim-support body 50, a trim mount 52 coupled to the trim-support body 50 t, and a trim-support plateau 54 coupled to the trim-support body 50 as shown in FIGS. 4B, 5B, and 6-8. The trim-support body 50 is coupled to the backrest frame 28 to mount the trim support 26 on the backrest 22 in a fixed position relative to the upper-back adjuster 24. The trim-support body 50 includes an attachment hook 70 that may be used to temporarily mount the trim support 26 to a corresponding feature on the backrest frame 28 as shown in FIG. 7. The trim-support body 50 is also formed to include an attachment aperture 74 that is configured to receive a fastener (not shown) to mount the trim support 26 to the backrest frame 28.

The trim mount 52 is located at a upper end 56 of the trim-support body 50. The trim mount 52 forms an attachment aperture 72 and the backrest trim 32 is configured to use the attachment aperture 72 to provide a secure attachment point for the backrest trim 32 to the backrest frame 28. The backrest trim 32 may be attached to the trim mount 52 by any suitable means, such as by hooks, fasteners, stitching, adhesive, or any other suitable attachment method, for example. The trim-support plateau 54 is spaced apart from the trim mount 52 and is arranged near an opposite lower end 58 of the trim-support body 50.

The trim-support plateau 54 is arranged to extend outwardly away from the trim-support body 50 and the backrest frame 28 as shown in FIGS. 1A, 2A and 6-8. The trim-support plateau 54 aligns a portion of the backrest trim 32 with the adjuster trim 36 when the adjuster plate 34 is in the retracted position so that the adjuster trim 36 and the portion of the backrest trim 32 are flush with one another. The trim-support plateau 54 has an outwardly-facing surface 57 with a shape that matches the interface gap 35 when the adjuster plate 34 is in the retracted position. The shape of the outwardly-facing surface 57 is triangular in illustrative embodiments, however, in other embodiments, any suitable shape may be used to match the interface gap 35.

A forward edge 55 of the trim-support plateau 54 provides a rearmost boundary for the adjuster plate 34 in the retracted position as shown in FIGS. 2A and 4B and as suggested in FIG. 6. The rearmost edge 43 of the first side wing 42 lies alongside the forward edge 55 such that the adjuster trim 36 and the backrest trim 32 contact one another along a first plane 60 in the retracted position. The first side wing 42 is arranged to overlie a recessed portion 51 of the trim-support body 50 in the retracted position such that the first side wing 42 and the outwardly-facing surface 57 of the trim-support plateau 54 are generally flush with one another. In this way, unaesthetic steps in the trim 32 caused by the foam pads 18 and/or the seat fame 16 are avoided.

The adjuster plate 34 is configured to move forward relative to the trim support 26 until the rearmost edge 43 of the first side wing 42 is arranged to lie along a second plane 62 forward of the first plane 60. In the illustrative embodiment, the first plane 60 and the second plane 62 are angled relative to one another by an angle 64 that is equal to about 7 degrees. The angle 64 between the first and second planes 60, 62 may vary depending on the amount of movement the adjuster plate 34 makes relative to the backrest. In other embodiments, the first and second planes 60, 62 may be parallel to one another.

The trim support 26 is sized and shaped such that the trim mount 52 is positioned forward of the second plane 62 at all times as shown in FIG. 6. The first side wing 42 moves relative to the trim support 26 over the recessed portion 51 of the trim-support body 50 while the trim-support plateau 54 pushes the backrest trim 32 outwardly to align with the adjuster trim. The backrest trim 32 and the adjuster trim 36 are then positioned to cooperate to provide the aesthetic outer cover for the seat back 14. It should be appreciated that the second side wing 44 and trim support 226 also cooperate with one another in the same manner to position the backrest trim 32 and the adjuster trim 36 relative to one another on the other lateral side of the seat back 14.

In some embodiments, the trim supports 26, 226 eliminate a gap between the backrest frame 28 and upper-back adjuster 24 (UBA) providing backrest trim 32 of the backrest that is flush with trim 36 of the UBA. The trim supports 26, 226 may also provide better trim support. There may be no structural visibility of the interior of the seat back in the UBA full forward position (extended position).

The following clauses include embodiments that are contemplated and non-limiting:

Clause 1. A seat back for a vehicle seat includes a backrest including a backrest frame, a foam pad arranged to at least partially cover the backrest frame, and a backrest trim arranged to cover the foam pad and the backrest frame and adapted to engage an occupant resting on the backrest.

Clause 2. The seat back of clause 1, any other clause, or any suitable combination of clauses, further including an upper-back adjuster coupled to the backrest and including an adjuster plate, an adjuster trim cover arranged to cover the adjuster plate, and an actuator configured to move the adjuster plate and the adjuster trim relative to the backrest between a retracted position and an extended position.

Clause 3. The seat back of clause 2, any other clause, or any suitable combination of clauses, further including a trim support coupled to the backrest in a fixed position relative to the backrest.

Clause 4. The seat back of clause 3, any other clause, or any suitable combination of clauses, wherein the trim support occupies an interface gap formed between the adjuster plate and the backrest when the adjuster plate and the adjuster trim are in the extended position and the backrest trim is arranged to cover the trim support so that only the backrest trim is visible in the interface gap when the adjuster plate and the adjuster trim are in the extended position to block an interior of the seat back from view.

Clause 5. The seat back of clause 4, any other clause, or any suitable combination of clauses, wherein the adjuster plate includes a front panel, a first side wing, and an opposite second side wing, and wherein one of the first side wing and the second side wing at least partially cover the trim support when the adjuster plate is in the retracted position.

Clause 6. The seat back of clause 5, any other clause, or any suitable combination of clauses, wherein first side wing is arranged to at least partially overlie the trim support in both the retracted position and the extended position.

Clause 7. The seat back of clause 6, any other clause, or any suitable combination of clauses, wherein the adjuster trim is wrapped around a rearward edge of the first side wing and is attached to an inner surface of the first side wing such that the backrest trim and the adjuster trim lie in an overlapping arrangement in both the retracted position and the extended position.

Clause 8. The seat back of clause 5, any other clause, or any suitable combination of clauses, wherein the trim support includes a trim-support body, a trim mount coupled to the trim-support body and configured to couple with the backrest trim to retain the backrest trim to the trim support, and a trim-support plateau coupled to the trim-support body and arranged to extend outwardly away from the trim-support body and the backrest frame to align a portion of the backrest trim with the adjuster trim when the adjuster plate is in the retracted position so that the adjuster trim and the portion of the backrest trim are flush with one another.

Clause 9. The seat back of clause 8, any other clause, or any suitable combination of clauses, wherein the trim-support plateau has an outwardly facing surface with a shape that matches the interface gap when the adjuster plate is in the retracted position.

Clause 10. The seat back of clause 9, any other clause, or any suitable combination of clauses, wherein the shape of the outwardly-facing surface is triangular.

Clause 11. The seat back of clause 8, any other clause, or any suitable combination of clauses, wherein a rearward edge of the first side wing lies alongside a forward edge of the trim-support plateau in the retracted position and the rearward edge of the first side wing is spaced apart from the forward edge of the trim-support plateau to lie between the trim mount and the trim-support plateau in the extended position.

Clause 12. The seat back of clause 8, any other clause, or any suitable combination of clauses, wherein the trim mount provides an attachment aperture and the backrest trim is coupled to the trim mount using the attachment aperture.

Clause 13. The seat back of clause 8, any other clause, or any suitable combination of clauses, wherein the trim-support body has a recessed portion that is offset from an outwardly-facing surface of the trim-support plateau, and the first side wing moves relative to the trim support over the recessed portion.

Clause 14. The seat back of clause 8, any other clause, or any suitable combination of clauses, wherein the trim support is a first trim support that is arranged to lie on a first lateral side of the backrest and the occupant support further includes a second trim support that is arranged to lie on an opposite second lateral side of the backrest.

Clause 15. A method includes a step of providing a vehicle seat including a seat bottom and a seat back, the seat back including a backrest frame, an upper-back adjuster plate coupled to the backrest frame for movement relative to the backrest frame between a retracted position and an extended position, and a trim support coupled to the backrest frame to occupy an interface gap formed between the backrest frame and the upper-back adjuster plate when the upper-back adjuster plate is in the extended position.

Clause 16. The method of clause 15, any other clause, or any suitable combination of clauses, further including a step of covering the backrest frame partially with a backrest trim.

Clause 17. The method of clause 16, any other clause, or any suitable combination of clauses, further including a step of attaching the backrest trim to the trim support such that the backrest trim covers the trim support so that only the backrest trim is visible in the interface gap when the upper-back adjuster plate is in the extended position.

Clause 18. The method of clause 17, any other clause, or any suitable combination of clauses, wherein the adjuster plate includes a front panel, a first side wing, and an opposite second side wing, and wherein one of the first side wing and the second side wing at least partially overlie the trim support when the adjuster plate is in the retracted position.

Clause 19. The method of clause 18, any other clause, or any suitable combination of clauses, wherein first side wing is arranged to at least partially overlie the trim support in both the retracted position and the extended position.

Clause 20. The method of clause 19, any other clause, or any suitable combination of clauses, further comprising the step of covering the adjuster plate with an adjuster trim, and wherein the adjuster trim is wrapped around a rearward edge of the first side wing and is attached to an inner surface of the first side wing such that the backrest trim and the adjuster trim lie in an overlapping arrangement in both the retracted position and the extended position.

Clause 21. The method of clause 20, any other clause, or any suitable combination of clauses, wherein the trim support includes a trim-support body, a trim mount coupled to the trim-support body and configured to couple with the backrest trim to retain the backrest trim to the trim support, and a trim-support plateau coupled to the trim-support body and arranged to extend outwardly away from the trim-support body and the backrest frame to align a portion of the backrest trim with the adjuster trim when the adjuster plate is in the retracted position so that the adjuster trim and the portion of the backrest trim are flush with one another.

Clause 22. The method of clause 21, any other clause, or any suitable combination of clauses, wherein the trim-support plateau has an outwardly facing surface with a shape that matches the interface gap when the adjuster plate is in the retracted position.

Clause 23. The method of clause 22, any other clause, or any suitable combination of clauses, wherein the shape of the outwardly-facing surface is triangular.

Clause 24. The method of clause 21, any other clause, or any suitable combination of clauses, wherein a rearward edge of the first side wing lies alongside a forward edge of the trim-support plateau in the retracted position and the rearward edge of the first side wing is spaced apart from the forward edge of the trim-support plateau to lie between the trim mount and the trim-support plateau in the extended position.

Clause 25. The method of clause 21, any other clause, or any suitable combination of clauses, wherein the trim support is a first trim support that is arranged to lie on a first lateral side of the backrest and the method further includes providing a second trim support that is arranged to lie on an opposite second lateral side of the backrest.

The invention claimed is:

1. A seat back for a vehicle seat, the seat back comprising
a backrest including a backrest frame, a foam pad arranged to at least partially cover the backrest frame, and a backrest trim arranged to cover the foam pad and the backrest frame and adapted to engage an occupant resting on the backrest,
an upper-back adjuster coupled to the backrest and including an adjuster plate, an adjuster trim cover arranged to cover the adjuster plate, and an actuator configured to move the adjuster plate and the adjuster trim relative to the backrest between a retracted position and an extended position, and
a trim support coupled to the backrest in a fixed position relative to the backrest,
wherein the trim support occupies an interface gap formed between the adjuster plate and the backrest when the adjuster plate and the adjuster trim are in the extended position and the backrest trim is arranged to cover the trim support so that only the backrest trim is visible in the interface gap when the adjuster plate and the adjuster trim are in the extended position to block an interior of the seat back from view.

2. The seat back of claim 1, wherein the adjuster plate includes a front panel, a first side wing, and an opposite second side wing, and wherein one of the first side wing and the second side wing at least partially cover the trim support when the adjuster plate is in the retracted position.

3. The seat back of claim 2, wherein first side wing is arranged to at least partially overlie the trim support in both the retracted position and the extended position.

4. The seat back of claim 3, wherein the adjuster trim is wrapped around a rearward edge of the first side wing and is attached to an inner surface of the first side wing such that the backrest trim and the adjuster trim lie in an overlapping arrangement in both the retracted position and the extended position.

5. The seat back of claim 2, wherein the trim support includes a trim-support body, a trim mount coupled to the trim-support body and configured to couple with the backrest trim to retain the backrest trim to the trim support, and a trim-support plateau coupled to the trim-support body and arranged to extend outwardly away from the trim-support body and the backrest frame to align a portion of the backrest trim with the adjuster trim when the adjuster plate is in the retracted position so that the adjuster trim and the portion of the backrest trim are flush with one another.

6. The seat back of claim 5, wherein the trim-support plateau has an outwardly facing surface with a shape that matches the interface gap when the adjuster plate is in the retracted position.

7. The seat back of claim 6, wherein the shape of the outwardly-facing surface is triangular.

8. The seat back of claim 5, wherein a rearward edge of the first side wing lies alongside a forward edge of the trim-support plateau in the retracted position and the rearward edge of the first side wing is spaced apart from the forward edge of the trim-support plateau to lie between the trim mount and the trim-support plateau in the extended position.

9. The seat back of claim 5, wherein the trim mount provides an attachment aperture and the backrest trim is coupled to the trim mount using the attachment aperture.

10. The seat back of claim 5, wherein the trim-support body has a recessed portion that is offset from an outwardly-facing surface of the trim-support plateau, and the first side wing moves relative to the trim support over the recessed portion.

11. The seat back of claim 5, wherein the trim support is a first trim support that is arranged to lie on a first lateral side of the backrest and the occupant support further includes a second trim support that is arranged to lie on an opposite second lateral side of the backrest.

12. A method comprising
providing a vehicle seat including a seat bottom and a seat back, the seat back including a backrest frame, an upper-back adjuster plate coupled to the backrest frame for movement relative to the backrest frame between a retracted position and an extended position, and a trim support coupled to the backrest frame to occupy an interface gap formed between the backrest frame and the upper-back adjuster plate when the upper-back adjuster plate is in the extended position,
covering the backrest frame partially with a backrest trim,
attaching the backrest trim to the trim support such that the backrest trim covers the trim support so that only the backrest trim is visible in the interface gap when the upper-back adjuster plate is in the extended position.

13. The method of claim 12, wherein the adjuster plate includes a front panel, a first side wing, and an opposite second side wing, and wherein one of the first side wing and the second side wing at least partially overlie the trim support when the adjuster plate is in the retracted position.

14. The method of claim 13, wherein first side wing is arranged to at least partially overlie the trim support in both the retracted position and the extended position.

15. The method of claim 14, further comprising the step of covering the adjuster plate with an adjuster trim, and wherein the adjuster trim is wrapped around a rearward edge of the first side wing and is attached to an inner surface of the first side wing such that the backrest trim and the adjuster trim lie in an overlapping arrangement in both the retracted position and the extended position.

16. The method of claim 15, wherein the trim support includes a trim-support body, a trim mount coupled to the trim-support body and configured to couple with the backrest trim to retain the backrest trim to the trim support, and a trim-support plateau coupled to the trim-support body and arranged to extend outwardly away from the trim-support body and the backrest frame to align a portion of the backrest trim with the adjuster trim when the adjuster plate is in the retracted position so that the adjuster trim and the portion of the backrest trim are flush with one another.

17. The seat back of claim 16, wherein the trim-support plateau has an outwardly facing surface with a shape that matches the interface gap when the adjuster plate is in the retracted position.

18. The seat back of claim 17, wherein the shape of the outwardly-facing surface is triangular.

19. The seat back of claim 16, wherein a rearward edge of the first side wing lies alongside a forward edge of the trim-support plateau in the retracted position and the rearward edge of the first side wing is spaced apart from the forward edge of the trim-support plateau to lie between the trim mount and the trim-support plateau in the extended position.

20. The seat back of claim 16, wherein the trim support is a first trim support that is arranged to lie on a first lateral side of the backrest and the method further includes providing a second trim support that is arranged to lie on an opposite second lateral side of the backrest.

* * * * *